US009026939B2

(12) United States Patent
Smus

(10) Patent No.: US 9,026,939 B2
(45) Date of Patent: May 5, 2015

(54) AUTOMATICALLY SWITCHING BETWEEN INPUT MODES FOR A USER INTERFACE

(71) Applicant: Google Inc., Mountain View, CA (US)

(72) Inventor: Boris Smus, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/917,578

(22) Filed: Jun. 13, 2013

(65) Prior Publication Data

US 2014/0368421 A1 Dec. 18, 2014

(51) Int. Cl.

| | |
|---|---|
| ***G06F 3/048*** | (2013.01) |
| ***G06F 3/042*** | (2006.01) |
| ***G06F 3/01*** | (2006.01) |
| ***G06F 3/041*** | (2006.01) |
| *G06F 3/0481* | (2013.01) |

(52) U.S. Cl.

CPC ................ *G06F 3/01* (2013.01); *G06F 3/0412* (2013.01); *G06F 3/0481* (2013.01)

(58) Field of Classification Search

CPC ........ G06F 3/01; G06F 3/0412; G06F 3/0481

USPC .................. 715/764, 800; 345/156, 163, 173; 710/14

See application file for complete search history.

(56) References Cited

U.S. PATENT DOCUMENTS

| | | | | |
|---|---|---|---|---|
| 6,266,059 | B1 | 7/2001 | Matthews, III et al. | |
| 6,756,999 | B2 | 6/2004 | Stoakley et al. | |
| 8,587,526 | B2 | 11/2013 | Engelhardt et al. | |
| 8,631,340 | B2 | 1/2014 | Schreiner et al. | |
| 8,881,032 | B1 | 11/2014 | Weber et al. | |
| 2009/0213134 | A1 | 8/2009 | Stephanick et al. | |
| 2010/0083179 | A1 | 4/2010 | Decker et al. | |
| 2010/0105443 | A1 | 4/2010 | Vaisanen | |
| 2012/0131485 | A1 | 5/2012 | Svendsen et al. | |
| 2013/0044080 | A1* | 2/2013 | Chiang | 345/174 |
| 2013/0050131 | A1 | 2/2013 | Lee et al. | |
| 2013/0127719 | A1* | 5/2013 | Yasutake | 345/163 |
| 2013/0191779 | A1* | 7/2013 | Radakovitz et al. | 715/800 |

OTHER PUBLICATIONS

Sinofsky, “Experiencing Windows 8 touch on Windows 7,” Sep. 13, 2011, retrieved from <http://blogs.msdn.com/b/b8/archive/2011/09/13/experiencing-windows-8-touch-on-windows-7-hardware.aspx>.

U.S. Appl. No. 13/831,297, filed Mar. 14, 2013.

* cited by examiner

*Primary Examiner* — Haoshian Shih

(74) *Attorney, Agent, or Firm* — McDermott Will & Emery LLP

(57) ABSTRACT

A system and machine-implemented method for automatically switching between input modes for a user interface. A user interface is displayed in a first input mode for a first input type. A determination is made that a predetermined event has occurred, wherein the predetermined event is of a type other than the first input type or a second input type. In response to the determination, the user interface is switched from the first input mode for the first input type to a second input mode for the second input type.

18 Claims, 5 Drawing Sheets

AUTOMATICALLY SWITCHING BETWEEN INPUT MODES FOR A USER INTERFACE

BACKGROUND

The present disclosure generally relates to user interfaces and, in particular, to automatically switching between input modes for a user interface.

Modern computing devices can be complex in their input profile. For example, smartphones can have both a touch screen and a physical keyboard. In another example, laptops can have standard keyboard/trackpad input as well as an external mouse, and in some cases even a touch screen. In addition, these devices can have cameras and microphones integrated into them for more specialized applications. Users can choose between all of these input modalities to accomplish their tasks. The users can also change the configuration of their devices, as in the case of a tablet that can be attached and detached from a keyboard, or a mouse that can be plugged into a laptop.

SUMMARY

The disclosed subject matter relates to automatically switching between input modes for a user interface. The method comprises displaying a user interface in a first input mode for a first input type, and determining that a predetermined event has occurred, wherein the predetermined event is of a type other than the first input type or a second input type. The method further comprises switching, in response to the determination, the user interface from the first input mode for the first input type to a second input mode for the second input type.

The disclosed subject matter further relates to system for automatically changing between input modes for a user interface. The system comprises one or more processors, and a machine-readable medium comprising instructions stored therein, which when executed by the processors, cause the processors to perform operations comprising displaying a user interface in a first input mode for a first input type. The operations further comprise determining that a predetermined event has occurred, wherein the predetermined event is of a type other than the first input type or a second input type, and switching, in response to the determination, the user interface from the first input mode for the first input type to a second input mode for the second input type, wherein the first input type corresponds to one of mouse input or touch input, and wherein the second input type corresponds to the other one of the mouse input or the touch input.

The disclosed subject matter also relates to a computer-implemented method for automatically switching between input modes for a user interface. The method comprises displaying a user interface in a first input mode for a first input type, and determining that a predetermined event has occurred. The method further comprises switching, in response to the determination, the user interface from the first input mode for the first input type to a second input mode for the second input type, wherein each of the first input mode and the second input mode includes one or more graphical components, and wherein the switching comprises resizing the one or more graphical components.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
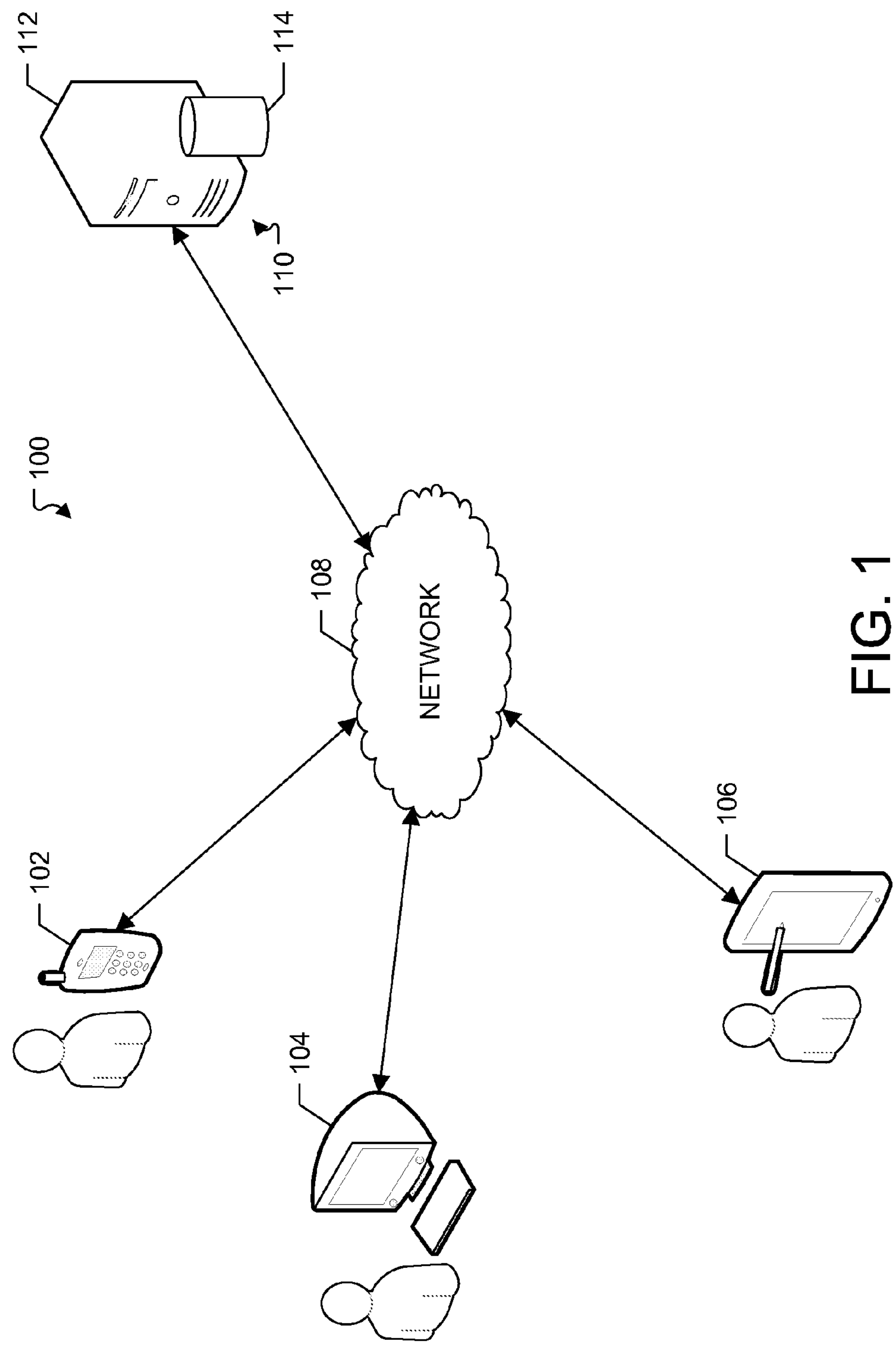
FIG. 1 illustrates an example network environment which can provide for automatically switching between input modes for a user interface.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, modern computing devices can be complex in their input profile. For example, smartphones can have both a touch screen and a physical keyboard. In another example, laptops can have standard keyboard/trackpad input as well as an external mouse, and in some cases even a touch screen. In addition, these devices can have cameras and microphones integrated into them for more specialized applications. Users can choose between all of these input modalities to accomplish their tasks. The users can also change the configuration of their devices, as in the case of a tablet that can be attached and detached from a keyboard, or a mouse that can be plugged into a laptop.

One problem with such devices is that as users go between input modes, user interfaces typically do not change, even though there are significant differences in modes. For example, going from mouse to touch, a user will generally hold the screen closer and have coarser input.

In this regard, a device can display a user interface in a touch mode or a mouse mode. In the touch mode, there is no hover state and larger interface elements (e.g., buttons or other targets) may be required. This is because touch typically requires that the user be closer to the screen. On the other hand, in the mouse mode, interface elements can be smaller (e.g., due to the finer pointer) and hover functionality can be provided. The subject technology provides for adapting a user interface to the user's current input mode.

The subject disclosure provides for automatically switching between input modes for a user interface. A user interface is displayed in a first input mode for a first input type. A determination is made that a predetermined event has occurred, wherein the predetermined event is of a type other than the first input type or a second input type. For example, the predetermined event can be, but is not limited to, user inactivity for a predetermined time period, the user (e.g., a user's hand or finger) being within a predetermined distance of a touchscreen, or the connecting of an external device. In response to the determination, the user interface is switched from the first input mode for the first input type to a second input mode for the second input type.

FIG. 1 illustrates an example network environment which can provide for automatically switching between input modes for a user interface. A network environment 100 includes a number of electronic devices 102-106 communicably connected to a server 110 by a network 108. Each of electronic devices 102-106 can include a touchscreen, which can be built into the device itself or can be electronically connected to the device (e.g., as a peripheral device). Server 110 includes a processing device 112 and a data store 114. Processing device 112 executes computer instructions stored in data store 114, for example, to provide content (e.g., a website or other display content) to any of electronic devices 102-106.

Electronic devices 102-106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

In some example aspects, any of the electronic devices 102-106 may obtain application data (e.g., web page data), and content (e.g., images, video, text, links) corresponding to the application data to be displayed on a touchscreen of the electronic device (e.g., 102-106). In some example aspects, the content can be transmitted from server 110 via the network 108 to the electronic devices 102-106. In other example aspects, the content can be stored in a storage component (e.g., hard disk, RAM, ROM, etc.) of the respective electronic devices 102-106.

Any of electronic devices 102-106 can display a user interface in a first input mode for a first input type. The electronic device (e.g., any of 102-106) determines that a predetermined event has occurred, wherein the predetermined event is of a type other than the first input type or a second input type.

In response to the determination, the electronic device switches the user interface from the first input mode for the first input type to a second input mode for the second input type. For example, an application (e.g., web browser) running on the electronic device may provide different sizes for graphical components (e.g., buttons, tabs) or may enable/disable hover content depending on the input mode. The different sizes for graphical components can correspond to different display sizes, or to different activation area sizes without changing the display size.

Alternatively, or in addition, server 110 may provide for the switching between the first input mode and the second input mode. For example, the electronic device (e.g., 102-106) may provide an indication of which input mode to operate in. In response to the received indication, server 110 (e.g., a web server) may provide different content to the electronic device. Such content can include, but is not limited to, different sizes for graphical components (e.g., different display sizes and/or activation area sizes for buttons of a website) or hover content/no hover content, depending on the input mode. In the event that the input mode switches, the application can send a new indication of the desired input mode, and server 110 can provide new content accordingly.

Server 110 may be any system or device having a processor, a memory, and communications capability for providing content to the electronic devices. In some example aspects, server 110 can be a single computing device such as a computer server. In other embodiments, server 110 can represent more than one computing device working together to perform the actions of a server computer (e.g., cloud computing).

Network 108 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
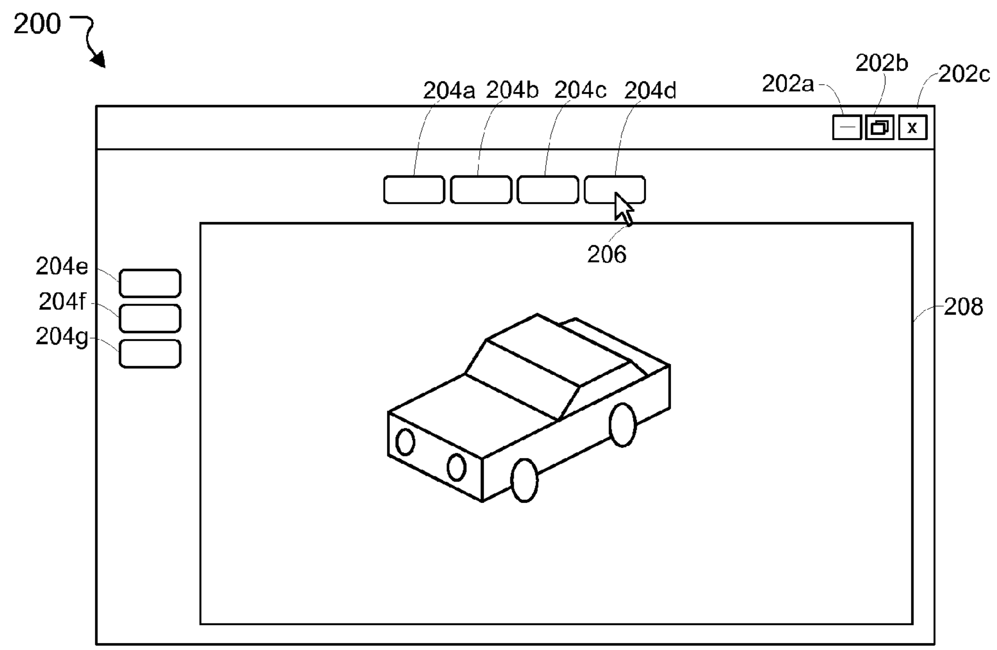
FIG. 2 illustrates an example of a user interface displayed in a mouse mode for mouse input.

FIG. 2 illustrates an example of a user interface displayed in a mouse mode for mouse input. User interface 200 includes graphical components which are displayed for use with mouse input. In the example of FIG. 2, mouse pointer 206 can be used to interact with the graphical components of user interface 200.

For example, the graphical components of user interface 200 include buttons 202*a*, 202*b* and 202*c*. Buttons 202*a*, 202*b* and 202*c* are used for minimizing, maximizing/restoring down, and closing an application (or application window), respectively. In addition, user interface 200 includes buttons 204*a*-204*g* for interacting with a content portion 208. For example, if user interface 200 corresponds to a mapping application, buttons 204*a*-204*g* can be used for operations including but not limited to panning, zooming, marking locations, specifying locations and switching map views.

In the mouse mode (e.g., for user interface 200), the graphical components (e.g., buttons 202*a-c*, buttons 204*a-g*) can be smaller in size relative to the touch mode. The smaller graphical components can correspond to a smaller display size for the graphical components. Alternatively, the smaller graphical components can correspond to smaller activation areas for the graphical components, without reduced display size. In example aspects, smaller targets and/or less space between targets can be used in the mouse mode, given the finer pointer motion and accuracy of a mouse relative to touch input.

In addition to smaller graphical components, the mouse mode can also provide for hover events. For example, upon a hover event (e.g., a mouseover and/or a mouseout), a user interface (e.g., user interface 200) can display hover content such as alternative (ALT) content. Alternatively, or in addition, upon the hover event, the user interface can open a menu or a submenu with additional interface components.

Figure 3:
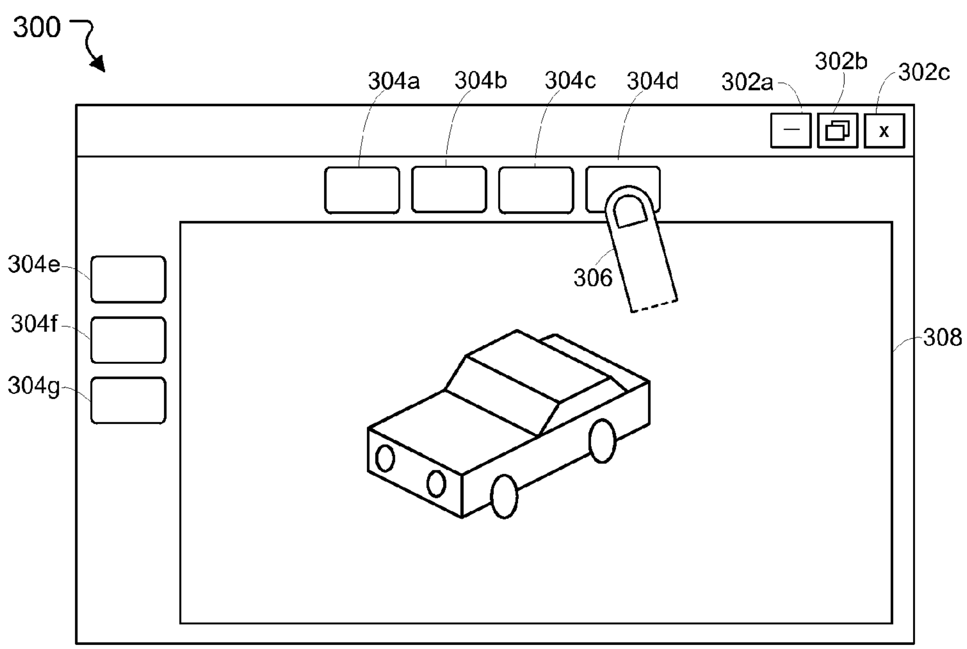
FIG. 3 illustrates an example of a user interface displayed in a touch mode for touch input.

FIG. 3 illustrates an example of a user interface displayed in a touch mode for touch input. User interface 300 includes graphical components which are displayed for use with touch input. In the example of FIG. 3, finger 306 (e.g., or a stylus) can be used to interact with the graphical components of user interface 300.

For example, the graphical components of user interface 300 include buttons 302*a*, 302*b* and 302*c*. Buttons 302*a*, 302*b* and 302*c* are used for minimizing, maximizing/restoring down, and closing an application (or application window), respectively. In addition, user interface 300 includes buttons

304*a*-304*g* for interacting with a content portion 308. For example, if user interface 300 corresponds to a mapping application, buttons 304*a*-304*g* can be used for operations including but not limited to panning, zooming, marking locations, specifying locations and switching map views.

In the touch mode (e.g., for user interface 300), the graphical components (e.g., buttons 302*a-c*, buttons 304*a-g*) can be larger in size relative to the mouse mode. The larger graphical components can correspond to a larger display size for the graphical components. Alternatively, the larger graphical components can correspond to larger activation areas for the graphical components, without increased display size. In example aspects, larger targets and/or more space between targets can be used in the touch mode, given the reduced precision of touch input relative to mouse input.

In example aspects, the touch mode may display fewer interface components (e.g., tools) at a given time relative to the mouse mode. Interface components normally shown in the mouse mode may be hidden from an initial or default view in the touch mode, and made accessible through additional interface(s) (e.g., a "show additional tools" button). In general, relative to the mouse mode, the touch mode can be adapted to be more touch-friendly for a user. For example, a photo editing application may show fewer tools and generally adapt to be more touch-friendly in the touch mode, relative to the mouse mode.

In addition, the touch mode may not provide for hover content, such as menus or ALT content which appear in response to a hover event. Thus, in lieu of the hover content provided in the mouse mode, alternative interface components can be used to provide similar content in the touch mode. For example, instead of menus or submenus which appear in response to a hover event in the mouse mode, a user interface (e.g., user interface 300) in the touch mode can display additional tabs or menus. These additional tabs or menus can always be displayed by default, or can appear in response to touch input. In another example, instead of ALT content which appears in response to a hover event in the mouse mode, the user interface in the touch mode can display additional content by default or in response to touch input.

With reference to FIGS. 2 and 3, there are different ways for automatically switching between the mouse mode and the touch mode. In response to a predetermined event, a user interface for an application can switch from the mouse mode (e.g., of user interface 200) to the touch mode (e.g., user interface 300), and vice versa.

The automatic switching between modes can be in response to receipt of touch input or mouse input. In one example, an application displaying a user interface in the touch mode can immediately switch to the mouse mode in response to mouse input. The application (e.g., a finger painting application) can default to display in the touch mode. However, upon receipt of mouse input or keyboard input, the user interface in the application can immediately switch to the mouse mode, which includes smaller interface components and may include hover content. Thus, the application can include program code which listens for an event corresponding to mouse input or keyboard input, and which responds to the event using an event handler.

In another example, an application displaying a user interface in the mouse mode can immediately switch to the touch mode in response to touch input. For, the application (e.g., a web browser) can default to display in the mouse mode. However, upon receipt of touch input, the user interface in the application can immediately switch to the touch mode, which includes larger interface components and does not provide hover functionality. Thus, the application can include program code which listens for an event corresponding to touch input, and which responds to the event using an event handler.

In addition to switching modes upon receipt of touch input or mouse input, it is possible for switching to occur in response to predetermined events of a type other than touch input or mouse input. For applications which include a default input mode (e.g., the mouse mode or the touch mode), the switch from the non-default mode to the default mode can occur after period of inactivity has been detected.

As noted above, an application (e.g., a finger painting application) defaulting to the touch mode can switch to the mouse mode in response to receiving mouse or keyboard input. In addition to this switch, example aspects provide for switching from the mouse mode (e.g., the non-default mode) back to the touch mode (e.g., the default mode) after a predetermined period of time since the last keyboard or mouse input.

More particularly, the application (e.g., the finger painting application) can initiate a timer upon receipt of keyboard or mouse input, and can further determine whether a preset period of time has passed since receipt of the last keyboard or mouse input. If the preset period of time has passed, the application can switch the user interface from the mouse mode to the touch mode. Of course, such switching can also occur for an application (e.g., a web browser) which defaults to display in the mouse mode, where the user interface switches from the touch mode back to the mouse mode in response to a preset period of time passing since receipt of the last touch input.

In addition to the foregoing predetermined events, automatic switching can occur in response to proximity of a user (e.g., hand or finger) to a touchscreen displaying the user interface. For example, when an application is displaying in the mouse mode, one or more sensors (e.g., cameras) can be used to detect the proximity of a user's finger to the touchscreen. When the user (or user movement) is within a predetermined distance of the touchscreen, this can suggest the user intends to use touch input. In response to detecting the proximity of the finger, the application can automatically switch from the mouse mode to the touch mode, prior to the user actually touching the screen.

Automatic switching can also occur in response to determining that an external device has been connected to the device displaying the user interface. For example, the device running the application with the user interface can correspond to a tablet computer, and the user interface can be displayed in the touch mode for touch input. The user of the tablet computer may connect an external device, such as an external keyboard or a mouse, to the tablet computer. In example aspects, connecting to the external device can correspond to docking the tablet computer to a docking station which includes the external keyboard/mouse. In response to connecting the external device, the application can switch the user interface from the touch mode to the mouse mode. Thus, the application can include program code which listens for an event corresponding to connecting to an external device, and which responds to the event using an event handler.

It should be noted that each of the foregoing predetermined events can separately initiate switching between input modes. For example, for an application (e.g., finger paint application) which defaults to the touch mode, a mouseclick event can switch the user interface to the mouse mode, and a predetermined amount of time without mouse input can cause the application to switch back to the touch mode. Upon docking the device to an external keyboard or mouse, the user interface can once again switch to the mouse mode. Further, upon detection that the user's finger is within a predetermined distance to the touchscreen, the user interface can switch back to the touch mode. Of course, this is one example of switching between modes based on different predetermined events, and other combinations of events are possible.

It should also be noted that since switching between the mouse mode and the touch mode can change the size of interface components, it is possible for the interface components (e.g., touch targets) to move away from their initial positions. As such, the application may provide intelligent resizing of a user interface, so as not to affect the position of interface components directly under the mouseclick/touch point.

In addition, as noted above with reference to FIG. 1, the switching between modes can correspond to a content server (e.g., server 110) providing different content depending on the input mode. Thus, as an alternative or in addition to the application running on an electronic device (e.g., 102-106) causing the switch between input modes, the electronic device running the application can send an indication to a server (e.g., 110) to switch between the mouse and touch modes. In response to receiving the indication, the server can provide different content (e.g., web content) to the electronic device. This different content can include, but is not limited to, different display sizes (or activation area sizes) for graphical components, or hover/no hover content for display within the application (e.g., web browser).

Although the foregoing examples describe switching between the mouse mode and the touch mode for the user interfaces illustrated in FIGS. 2 and 3, the subject technology is not limited to these modes or to such user interfaces. Rather, the subject technology can be employed for different types of user interfaces, and the interfaces can adapt to one of multiple potential input types, such as but not limited to, mouse, trackball, pen, stylus, touch and/or trackpad input.

Figure 4:
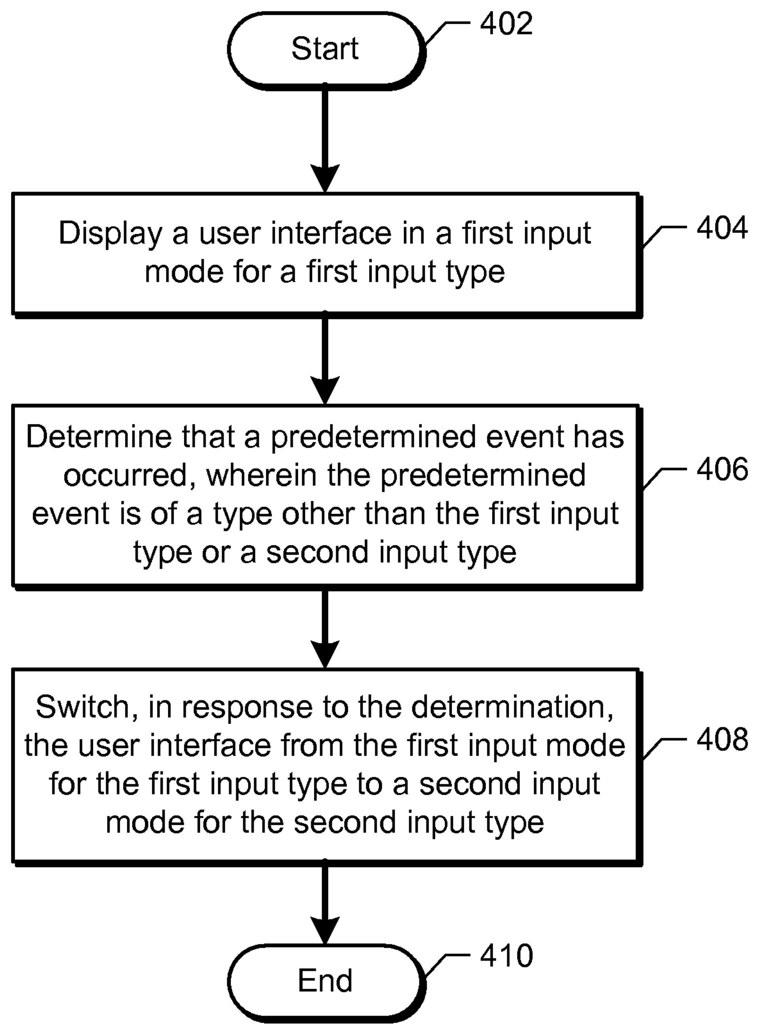
FIG. 4 illustrates an example process which provides for automatically switching between input modes for a user interface.

FIG. 4 illustrates an example process which provides for automatically switching between input modes for a user interface. Following start block 402, a user interface is displayed in a first input mode for a first input type at step 404. At step 406, a determination is made that a predetermined event has occurred, wherein the predetermined event is of a type other than the first input type or a second input type.

At step 408, in response to the determination, the user interface is switched from the first input mode for the first input type to a second input mode for the second input type. The first input type can correspond to one of mouse input or touch input, and the second input type can correspond to the other one of the mouse input or the touch input. One of the first input mode or the second input mode can correspond to a mouse mode for mouse input, and the other one of the first input mode or the second input mode can correspond to a touch mode for touch input.

Displaying the user interface in the mouse mode can provide for hover content in the user interface, and displaying the user interface in the touch mode can provide for no hover content in the user interface. Alternatively, or in addition, displaying the user interface in the mouse mode can provide for smaller pointer targets in the user interface relative to the touch mode, and displaying the user interface in the touch mode can provide for larger pointer targets in the user interface relative to the mouse mode.

Displaying the user interface in the first input mode can be in response to receipt of user input of the first input type. In example aspects, determining that the predetermined event has occurred can include initiating a timer upon receipt of the user input of the first input type, and determining, based on the initiated timer, that a preset period of time has passed since receipt of the user input of the first input type. The switching is performed in response to the determination that the preset period of time has passed.

Determining that the predetermined event has occurred can include detecting, using a sensor, a distance of a user from a screen on which the user interface is displayed (e.g., a distance of a user's finger from the screen), and determining, based on the detecting, that the user is within a predefined distance of the screen. The switching is performed in response to determining that the user is within the predefined distance.

The user interface is displayed on a device. Determining that the predetermined event has occurred can include determining that an external device has been connected to the device. The switching is performed in response to determining that the external device has been connected to the device. For example, the external device can be a keyboard or a mouse. The process then ends at end block 410.

Figure 5:
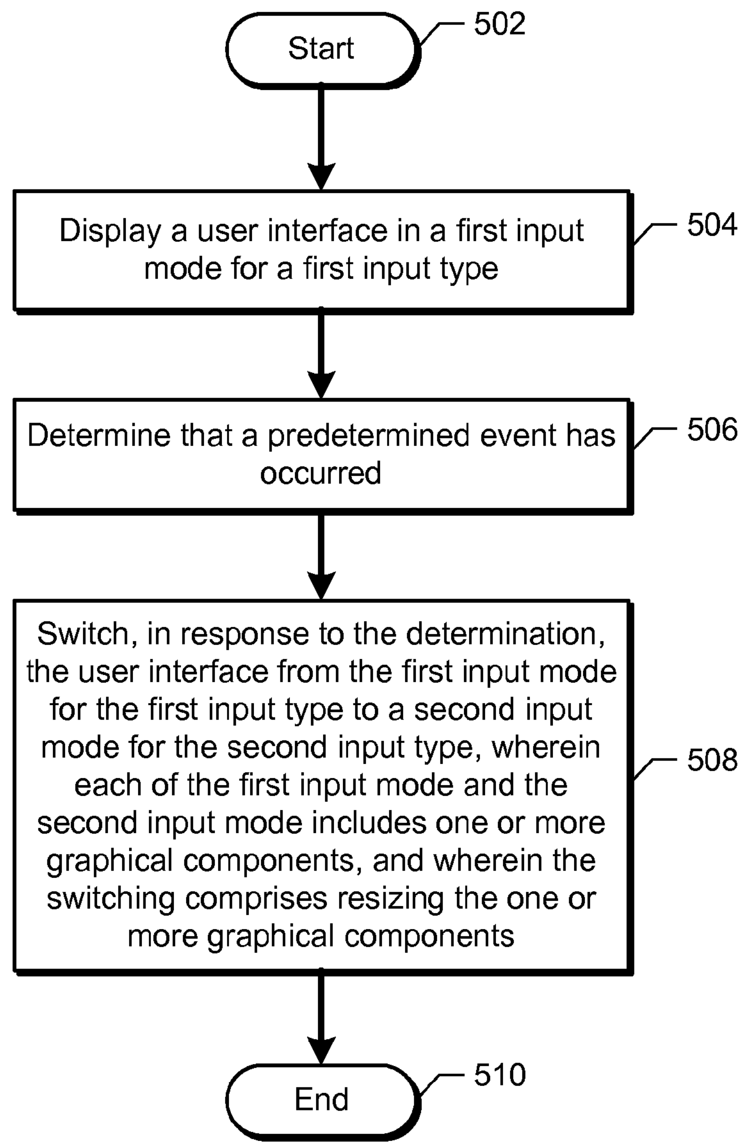
FIG. 5 illustrates another example process which provides for automatically switching between input modes for a user interface.

FIG. 5 illustrates another example process which provides for automatically switching between input modes for a user interface. Following start block 502, a user interface is displayed in a first input mode for a first input type at step 504. At step 506, a determination is made a predetermined event has occurred.

At step 508, in response to the determination, the user interface is switched from the first input mode for the first input type to a second input mode for the second input type. Each of the first input mode and the second input mode includes one or more graphical components. The switching comprises resizing the one or more graphical components.

The resizing can comprise resizing the display size of the one or more graphical components. The resizing can further comprise resizing the activation area for the one or more graphical components to correspond with the resized display size. Alternatively, the resizing can comprise resizing the activation area of the graphical components without resizing the display size.

The first input type can correspond to one of mouse input or touch input, and the second input type can correspond to the other one of the mouse input or the touch input. One of the first input mode or the second input mode can correspond to a mouse mode for mouse input, and the other one of the first input mode or the second input mode can correspond to a touch mode for touch input.

The predetermined event can be of the first input type or the second input type. Alternatively, or in addition, the predetermined event can be of a type other than the first input type or a second input type.

Figure 6:
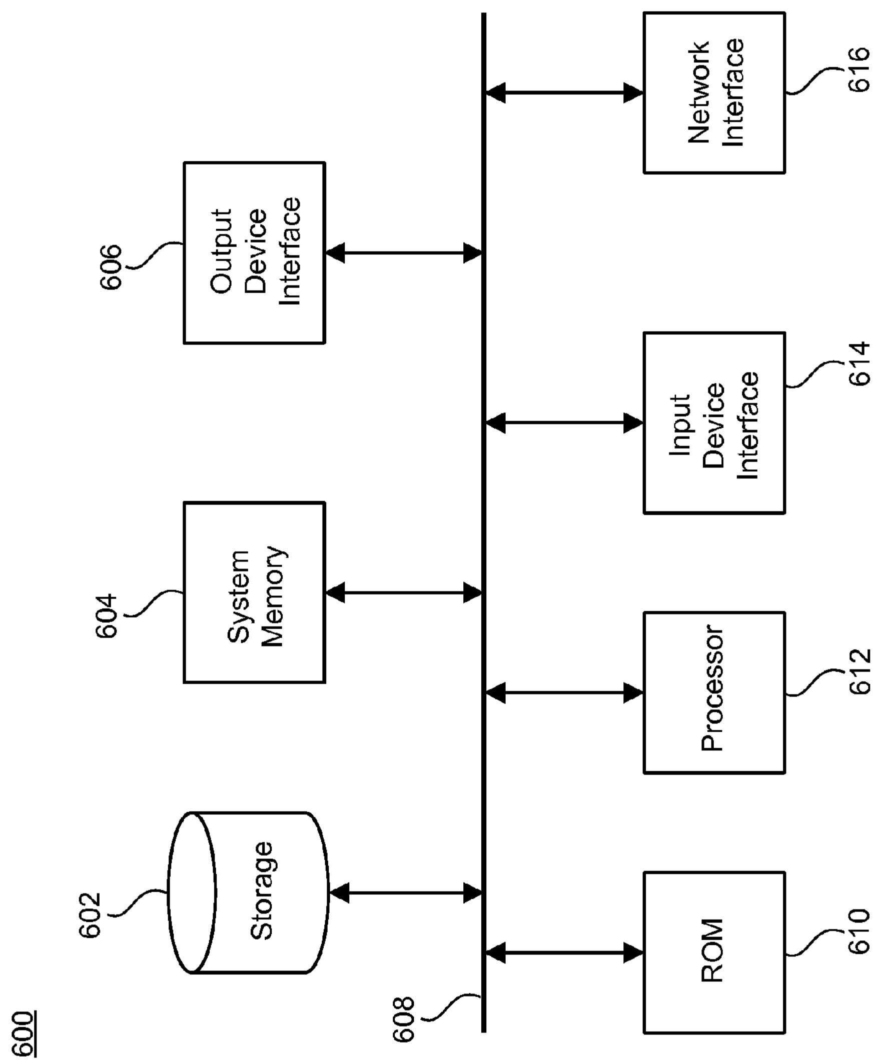
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, or ROM 610. For example, the various memory units include instructions for changing between input modes in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network ("LAN"), a wide area network ("WAN"), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms “computer”, “server”, “processor”, and “memory” all refer to electronic or other technological devices. These terms exclude people or groups of people. For the purposes of the specification, the terms display or displaying means displaying on an electronic device. As used in this specification and any claims of this application, the terms “computer readable medium” and “computer readable media” are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (“LAN”) and a wide area network (“WAN”), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an “aspect” does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a “configuration” does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for automatically switching between input modes for a user interface, the method comprising:

displaying, on a screen, a user interface in a first input mode for a first input type;

detecting, using a sensor, a distance of a user from the screen;

determining, prior to receiving touch input on the screen, that the detected distance from the screen is within a threshold distance; and switching, in response to the determination and prior to receiving the touch input on the screen, the user interface from the first input mode for the first input type to a second input mode for a second input type, wherein the second input mode corresponds to a touch mode for touch input.

2. The method of claim 1, wherein the displaying the user interface in the first input mode is in response to receipt of user input of the first input type.

3. The method of claim 2, further comprising:

initiating a timer upon receipt of the user input of the first input type; and determining, based on the initiated timer, that a preset period of time has passed since receipt of the user input of the first input type, wherein the switching is further performed in response to the determination that the preset period of time has passed.

4. The method of claim 1, wherein the user interface is displayed on the screen of a device, the method further comprising:

determining that an external device has been connected to the device, wherein the switching is further performed in response to determining that the external device has been connected to the device.

5. The method of claim 4, wherein the external device is at least one of a keyboard or a mouse.

6. The method of claim 1, wherein the first input type corresponds to mouse input.

7. The method of claim 6, wherein the first input mode corresponds to a mouse mode for mouse input.

8. The method of claim 7, wherein displaying the user interface in the mouse mode provides for hover content in the user interface, and wherein displaying the user interface in the touch mode does not provide for hover content in the user interface.

9. The method of claim 7, wherein displaying the user interface in the mouse mode provides for smaller pointer targets in the user interface relative to the touch mode, and wherein displaying the user interface in the touch mode provides for larger pointer targets in the user interface relative to the mouse mode.

10. A system for automatically changing between input modes for a user interface, the system comprising:

one or more processors; and a machine-readable medium comprising instructions stored therein, which when executed by the processors, cause the processors to perform operations comprising:

displaying, on a screen, a user interface in a first input mode for a first input type;

detecting, using a sensor, a distance of a user from the screen;

determining, prior to receiving touch input on the screen, that the detected distance from the screen is within a threshold distance; and switching, in response to the determination and prior to receiving the touch input on the screen, the user interface from the first input mode for the first input type to a second input mode for a second input type, wherein the second input mode corresponds to a touch mode for touch input.

11. The system of claim 10, wherein the displaying the user interface in the first input mode is in response to receipt of user input of the first input type.

12. A computer-implemented method for automatically switching between input modes for a user interface, the method comprising:

displaying, on a screen, a user interface in a first input mode for a first input type;

detecting, using a sensor, a distance of a user from the screen;

determining, prior to receiving touch input on the screen, that the detected distance from the screen is within a threshold distance; and switching, in response to the determination and prior to receiving the touch input on the screen, the user interface from the first input mode for the first input type to a second input mode for a second input type, wherein the second input mode corresponds to a touch mode for touch input, wherein each of the first input mode and the second input mode includes one or more graphical components, and wherein the switching comprises resizing the one or more graphical components.

13. The method of claim 12, wherein the resizing comprises resizing the display size of the one or more graphical components.

14. The method of claim 13, wherein the resizing further comprises resizing the activation area for the one or more graphical components to correspond with the resized display size.

15. The method of claim 12, wherein the resizing comprises resizing the activation area of the graphical components without resizing the display size.

16. The method of claim 12, wherein the first input type corresponds to mouse input.

17. The method of claim 16, wherein the first input mode corresponds to a mouse mode for mouse input.

18. The method of claim 1, wherein the sensor is a camera.

* * * * *